United States Patent [19]

Hirose et al.

[11] Patent Number: 4,844,987

[45] Date of Patent: Jul. 4, 1989

[54] POLYAMIDE MOLDING MATERIAL AND HOLLOW-MOLDED BODY OBTAINED THEREFROM

[75] Inventors: Masahiko Hirose; Takatoshi Kuratsuji, both of Matsuyama; Tooru Matsubayashi; Kouichi Sakai, both of Sagamihara, all of Japan

[73] Assignee: Teijin Limited, Osaka, Japan

[21] Appl. No.: 924,683

[22] Filed: Oct. 28, 1986

[30] Foreign Application Priority Data

Oct. 29, 1985 [JP] Japan ............................. 60-240442
Nov. 25, 1985 [JP] Japan ............................. 60-262499
Nov. 26, 1985 [JP] Japan ............................. 60-263782

[51] Int. Cl.$^4$ ..................... B32B 27/08; B32B 27/34; B32B 27/36
[52] U.S. Cl. .......................... 428/474.4; 428/475.2; 428/480
[58] Field of Search ............... 428/480, 475.2, 35, 428/36, 474.4; 525/276

[56] References Cited

U.S. PATENT DOCUMENTS

| | | | |
|---|---|---|---|
| 3,876,729 | 4/1975 | Mueller | 525/276 |
| 4,576,842 | 3/1986 | Hartsing et al. | 428/475.2 |
| 4,654,240 | 3/1987 | Johnston | 428/35 |
| 4,692,327 | 9/1987 | Takahashi et al. | 428/35 |
| 4,728,549 | 3/1988 | Shimizu et al. | 428/475.2 X |

*Primary Examiner*—Thomas J. Herbert
*Attorney, Agent, or Firm*—Kenyon & Kenyon

[57] ABSTRACT

A material for forming a hollow-molded body, which comprises a polyamide comprising hexamethylene isophthalamide units as the main recurring units. A hollow-molded body having an excellent gas barrier property can be obtained by using this polyamide molding material alone or in combination with polyethylene terephthalate.

12 Claims, No Drawings

POLYAMIDE MOLDING MATERIAL AND HOLLOW-MOLDED BODY OBTAINED THEREFROM

BACKGROUND OF THE INVENTION (1) Field of the Invention

The present invention relates to a polyamide molding material and a hollow-molded body obtained therefrom. More particularly, the present invention relates to a molding material capable of producing a hollow-molded body having an excellent gas barrier property (resistance to permeation of gases), and excellent mechanical characteristics and heat resistance.

(2) Description of the Related Art

Because of its excellent mechanical and chemical properties, polyethylene terephthalate is widely used as fibers, films, and industrial resins. Recently, polyethylene terephthalate has also been used for the production of vessels such as bottles and cups. In this field of application, from the view point of preservation of the contents, a gas barrier property is required. Polyethylene terephthalate has a higher gas barrier property than polyolefin resins such as polyethylene, but the gas barrier property of polyethylene terephthalate is unsatisfactory when compared with the gas barrier property of glass, aluminum or the like.

Methods for improving the gas barrier property of polyethylene terephthalate have been examined and many proposals have been made. For example, there have been proposed a process in which a polyester is coated or laminated with a gas barrier material such as polyvinylidene chloride or a saponified ethylene/vinyl acetate copolymer (Japanese Unexamined Patent Publications No. 54-117868 and No. 56-64839); a process in which a polyester is blended with a gas barrier material (Japanese Unexamined Patent Publication No. 57-19640); and, a process in which the gas barrier property is improved by increasing the orientation degree of a polyester molded body (Japanese Unexamined Patent Publication No. 56-15148). However, in the process in which the orientation degree is increased, the improvement of the gas barrier property is limited, and in the process in which a gas barrier material is used, the adhesion and heat resistance are unsatisfactory, and accordingly, the development of a gas barrier material having enhanced characteristics is desired.

SUMMARY OF THE INVENTION

Therefore, a primary object of the present invention is to solve the foregoing problems involved in the conventional technique and provide a molding material capable of producing a hollow-molded body having an excellent gas barrier property, mechanical characteristics, and heat resistance, and to provide such a hollow-molded body obtained from this molding material.

In accordance with the present invention, there is provided a molding material for the formation of a hollow-molded body, which comprises a polyamide comprising hexamethylene isophthalamide units as the main recurring units.

Furthermore, in accordance with the present invention, there is provided a hollow-molded body obtained from the above-mentioned molding material.

DESCRIPTION OF THE PREFERRED EMBODIMENTS

The polyamide usable for the present invention is a polyamide comprising hexamethylene isophthalamide units as the main recurring units. By the expression "comprising hexamethylene isophthalamide units as the main recurring units" used herein, is meant that the polyamide comprises hexamethylene isophthalamide units in an amount exceeding 50 mole %. Accordingly, the copolyamide may contain up to 50 mole % of other amide units. As the comonomer component constituting other amide units, there can be mentioned, in addition to isophthalic acid and hexamethylene diamine, dicarboxylic acids, diamines, aminocarboxylic acids, and lactams. More specifically, there can be mentioned aromatic dicarboxylic acids such as terephthalic acid, naphthalene-dicarboxylic acid, diphenyldicarboxylic acid, diphenoxyethane-dicarboxylic acid, diphenylsulfone-dicarboxylic acid, diphenylketone-dicarboxylic acid, sodium-sulfoisophthalic acid, and dibromoterephthalic acid; alicyclic dicarboxylic acids such as decalin-dicarboxylic acid; aliphatic dicarboxylic acids such as succinic acid and adipic acid; aliphatic diamines such as ethylene diamine, trimethylene diamine, and tetramethylene diamine; aromatic diamines such as phenylene diamine, xylylene diamine, 3,6-diaminoacridine, N-methyl-p-phenylene diamine, N,N-dimethyl-p-phenylene diamine, and tolylene diamine; alicyclic diamines such as 1,2-diaminocyclobutane; aliphatic aminocarboxylic acids such as glycine, alanine and valine; aromatic aminocarboxylic acids such as phenylalanine and aminobenzoic acid; alicyclic aminocarboxylic acids such as aminocyclohexane-carboxylic acid; and lactams such as $\beta$-propiolactam, $\gamma$-butyrolactam and $\epsilon$-caprolactam.

In the polyamide molding material of the present invention, the content of the hexamethylene isophthalamide units must exceed 50 mole % of the total recurring units, and preferably, the content of hexamethylene isophthalamide units is higher than 80 mole % of the total recurring units. If the content of the hexamethylene isophthalamide units is up to 50 mole %, the gas barrier property is unsatisfactory. A polyfunctional compound such as trimellitic acid, trimesic acid, pyromellitic acid, tricarballylic acid, triaminopropane, triaminobenzene, tetraaminobenzene, pentaaminobenzene, aspartic acid, glutamic acid, lysine or arginine, or a monofunctional compound such as o-benzoylbenzoic acid or naphthoic acid, may be bonded to the polyamide, so long as the polymer remains substantially linear.

In view of the strength necessary for the final hollow-molded body, preferably the inherent viscosity ([$\eta$] inh: the inherent viscosity of a solution of 0.5 g of the polyamide in 100 ml of concentrated sulfuric acid) of the polyamide used in the present invention is at least 0.5.

The polyamide used in the present invention can be prepared according to any known method for the preparation of polyamides. For example, the polyamide can be prepared by condensing dimethyl isophthalate with hexamethylene diamine in methanol as the solvent or condensing dimethyl isophthalate with hexamethylene diamine to form a salt, and polycondensing the obtained reaction product. Various polycondensation catalysts and stabilizers may be used for the polymerization. Furthermore, other additives such as a colorant, a fluorescent whitening agent, an oxidation stabilizer, and ultraviolet absorber, an antistatic agent and a flame retardant may be used according to need.

The intended hollow-molded body can be prepared by using the polyamide molding material alone or in combination with polyethylene terephthalate.

As the hollow-molded body of the present invention, there can be mentioned vessels obtained according to a molding method including a drawing step, such as a bottle and a cup. This hollow-molded body can be prepared according to methods similar to the methods customarily adopted for the formation of hollow-molded bodies of polyethylene terephthalate. For example, the extrusion-blow-molding method, the injection-blow-molding method, and the biaxial draw-blow-molding method; the biaxial draw-blow-molding method (so-called orientation-blowing method) is especially preferred. In the blow-molding operation, preferably the draw ratio is 1 to 3 in the axial direction and 1 to 5 in the lateral direction, and the draw area ratio is 2 to 15, especially 4 to 10. The thin portion of the barrel of the so-obtained hollow-molded body is oriented in at least one direction, thus enhancing the strength of the hollow-molded body. Moreover, a process can be adopted in which an undrawn sheet is deep-drawn and subjected to compression forming or vacuum forming, or a process in which a pipe obtained by injection molding is drawn and oriented to obtain a cylinder and the cylinder is integrated with a lid member to obtain a can body.

The polyamide hollow-molded body obtained in the above-mentioned manner according to one embodiment of the present invention is superior to a hollow-molded body of nylon 6 or nylon 6,6 in that, since the polyamide contains an aromatic ring, deterioration by water is controlled and the gas barrier property is improved. The polyamide hollow-molded body of the present invention has an excellent gas barrier property. For example, the carbon dioxide gas permeation coefficient of the polyamide hollow-molded body of the present invention in 0.5 to 5% that of a hollow-molded body of polyethylene terephthalate. Therefore, the polyamide hollow-molded body is very valuable as a vessel for carbonated drinks, beer, or the like.

The polyethylene terephthalate that can be used in combination with the polyamide molding material of the present invention is a polyester comprising at least 80 mole % of ethylene terephthalate units based on the total recurring units. A part of the terephthalic acid component may be replaced by at least one member selected from bifunctional carboxylic acids; for example; aromatic dicarboxylic acids such as isophthalic acid, naphthalene-dicarboxylic acid, diphenyldicarboxylic acid, diphenoxyethane-dicarboxylic acid, diphenyl ether-dicarboxylic acid, and diphenylsulfonedicarboxylic acid; alicyclic carboxylic acids such as hexahydroterephthalic acid and hexahydroisophthalic acid; aliphatic dicarboxylic acids such as adipic acid, sebacic acid, and azelaic acid; and hydroxyacids such as p-$\beta$-hydroxyethoxybenzoic acid, p-hydroxybenzoic acid, and $\epsilon$-hydroxycaproic acid, and/or a part of the ethylene glycol component may be replaced by at least one member selected from other glycols such as trimethylene glycol, tetramethylene glycol, hexamethylene glycol, decamethylene glycol, neopentyl glycol, diethylene glycol, 1,1-cyclohexane dimethylol, 1,4-cyclohexane dimethylol, 2,2-bis(4-8-hydroxyethoxyphenyl)propane, and bis(4-$\beta$-hydroxyethoxyphenyl)sulfone, and these copolyesters may be used as the polyethylene terephthalate so long as the above-mentioned requirement of the content of ethylene terephthalate units is satisfied. In view of the mechanical properties, preferably the inherent viscosity [$\eta$] of the polyethylene terephthalate is at least 0.5, especially at least 0.6, as measured in o-chlorophenol as the solvent at 35° C.

The polyamide used in the present invention may be mixed with another polyamide. In this case, preferably the content of hexamethylene isophthalamide units is at least 50 mole %, especially at least 80 mole %, based on the total polyamide composition. As preferred examples of the other polyamide, there can be mentioned nylon 66 nylon 6, and nylon 12.

In accordance with another embodiment of the present invention, there is provided a multi-layer drawn hollow-molded body having a multi-layer structure comprising at least one layer composed of the above-mentioned polyamide material and at least one layer composed of the above-mentioned polyethylene terephthalate.

In the multi-layer drawn hollow-molded body of the present invention, any combination of at least two layers including the polyethylene terephthalate layer and the polyamide layer may be adopted as the multi-layer structure. For example, a two-layer structure comprising the polyethylene terephthalate layer as the inner layer and the polyamide layer as the outer layer; a three-layer structure comprising an adhesive layer between the polyethylene terephthalate and polyamide layers; a three-layer structure comprising outer and inner layers composed of the polyethylene terephthalate and an intermediate layer composed of the polyamide; and a five-layer structure comprising an adhesive layer interposed between the polyethylene terephthalate and polyamide layers in the above-mentioned three-layer structure. In view of the physical properties, especially the gas barrier property, of the hollow-molded body, preferably the weight ratio of the polyamide layer is 5 to 50% by weight, especially 10 to 30% by weight.

The multi-layer drawn hollow-molded body of the present invention is prepared, in principle, according to the conventional draw-blow-forming method. Namely, the hollow-molded body is prepared by forming a multi-layer preform in advance and subjecting the preform to draw-blowing. The multi-layer preform can be prepared, for example, by forming a pipe-shaped multi-layer structure comprising a polyethylene terephthalate layer and a polyamide layer, by simultaneous multi-layer coextrusion, cutting the pipe into a predetermined length, and heat-molding both ends of the cut pipe into a desired mouth and bottom. Furthermore, the multi-layer injection molding method may be adopted in which a polyamide is injected on the inner or outer surface of a polyethylene terephthalate layer or between polyethylene terephthalate layers to form a preform having a multi-layer structure. When this multi-layer preform is drawn or blow-expanded, preferably the draw area ratio of the barrel of the bottle is at least 1.2, especially at least 2.

In accordance with still another embodiment of the present invention, there is provided an oriented hollow-molded body comprising a resin composition comprising the above-mentioned polyamide material and polyethylene terephthalate. The polyamide material is incorporated in an amount of 1 to 100 parts by weight, preferably 5 to 50 parts by weight, per 100 parts by weight of the polyethylene terephthalate.

Preferably, the resin composition is melt-kneaded and mixed by an extruder to form a mixed pellet and the pellet formed into a preform. Furthermore, a method may be adopted in which granules of the polyester and granules of the polyamide are dry-blended and the blend is directly formed into a preform. The resin composition can be formed into a hollow-molded body according to the above-mentioned process for the preparation of a hollow-molded body.

The hollow-molded body of the present invention has an excellent gas barrier property, mechanical properties, and heat resistance. Accordingly, the hollow-molded body of the present invention can be used as a vessel for food, drinks or cosmetics, especially as a vessel for carbonated drinks.

The present invention will now be described in detail with reference to the following examples. In the examples, all "parts" are by weight, and the properties described in the examples were determined according to the following methods.

(1) Inherent Viscosity ($[\eta]$) of Polyethylene Terephthalate

The inherent viscosity was measured at 35° C. in o-chlorophenol as the solvent.

(2) Inherent Viscosity ($[\eta]$) of Polyamide

The inherent viscosity was measured at 30° C. in concentrated sulfuric acid as the solvent.

(3) Carbon Dioxide Gas Permeation Coefficient $P_{CO2}$

A circular sample having a diameter of 30 mm was cut from the central portion of a straight barrel of a bottle and the carbon dioxide gas permeation coefficient was measured by a gas permeation coefficient measuring apparatus (Model K-315-N-03 supplied by Rika Seiki Kogyo) at 30° C.

(4) Falling Impact Strength of Bottle

A bottle was charged with 1000 g of water and 14 g of citric acid, and 14 g of sodium bicarbonate weighed in a polyethylene bag was inserted in the mouth portion of the bottle in such a manner that the sodium bicarbonate was not in direct contact with the aqueous solution of citric acid in the bottle. Immediately, the bottle was plugged with an aluminum cap, and the bottle then shaken so that the sodium bicarbonate inserted in the bottle was sufficiently mixed with the aqueous solution of citric acid, whereby $CO_2$ was generated. As a result, the bottle then contained an aqueous solution in which $CO_2$ was dissolved under pressure. The $CO_2$-filled bottle was maintained at 5° C. for 24 hours, and the bottle was allowed to drop onto a concrete floor surface from a height of 1.5 m, in such a manner that the bottom of the bottle was located downward. The ratio of the number of broken bottles to the total number of tested bottles was determined.

(5) Carbon Dioxide Gas Barrier Property of Bottle

In the same manner as described above with respect to the method for measuring the falling impact strength, $CO_2$ was dissolved under pressure in $H_2O$ in a volume 4 times as large s the volume of $H_2O$, and the $CO_2$-filled bottle was placed in an atmosphere maintained at a predetermined temperature and a predetermined humidity, for a predetermined time. The bottle was then transferred to an atmosphere maintained at 20° C. and the $CO_2$ pressure in the bottle was measured when the temperature of the content liquid reached 20° C. Thus, the volume of residual $CO_2$ was determined according to the following equation:

$$\text{Volume of } CO_2 = V_{CO2}/V_{H2O}$$

wherein $V_{H2O}$ stands for the volume of $H_2O$ liquid in the bottle, and $V_{CO2}$ stands for the volume, as calculated as the gas at 0° C. under 1 atmosphere, of $CO_2$ dissolved in the liquid phase of $H_2O$ in the bottle.

EXAMPLE 1 AND COMPARATIVE EXAMPLES 1 AND 2

A mixture comprising 489 parts of dimethyl isophthalate, 296 parts of hexamethylene diamine, and 1980 parts of methanol was refluxed at 180° C. for 3 hours in a current of $N_2$ to expel methanol. Reaction was then carried out at 160° C. for 30 minutes under a low vacuum (about 15 mmHg), the temperature was gradually elevated to 270° C., and reaction was conducted for 4 hours under a high vacuum (about 1 mmHg). The inherent viscosity $[\eta]$ of the obtained polymer (nylon 6I) was 1.0.

The obtained nylon 6I was vacuum-dried at 100° C. for 8 hours and then melted. The melt was then injection-molded at a molding temperature of 280° to 290° C. and a mold temperature of 10° C. to form a preform having one end closed as a bottom. The outer diameter of the resultant cylindrical barrel was 25 to 26 mm, the thickness was 3.5 mm, and the total length was 155 mm.

A single-layer blow-molded bottle made from the above-mentioned nylon 6I, nylon 6I/66 or nylon 6I/6 had non-uniform thickness at the barrel portion.

The preform was subjected to blow-forming at a preform-heating temperature of 110° to 130° C. by using a biaxial draw-blow-forming machine (Model RHB-L supplied by Cincinnati Miraclon Co.) to obtain a 1-liter transparent bottle in which the outer diameter of the barrel was 80 mm, the total height was 280 mm, and the thickness of the barrel was uneven as being 320 to 380 μm. The carbon dioxide gas permeation coefficient of the obtained bottle was $2.1 \times 10^{12}$ cm$^3$·cm/cm$^2$·sec·cmHg, as measured in contact with water.

The carbon dioxide gas permeation coefficient of a bottle obtained by similarly molding polyethylene terephthalate having an inherent viscosity $[\eta]$ of 0.61 [calculated from the melt viscosity measured at 35° C. in phenol/tetrachloroethane (60/40 weight ratio)] was $18 \times 10^{12}$ cm$^3$·cm/cm$^2$·sec·cmHg. Accordingly, it was confirmed that the polymer of this example has a far superior gas barrier property than that of polyethylene terephthalate.

For comparison, the carbon dioxide gas permeation coefficients of nylon 6 having an inherent viscosity $[\eta]$ of 1.1, and nylon 6,6 having an inherent viscosity $[\eta]$ of 0.9, were measured. It was found that the carbon dioxide gas permeation coefficients of nylon 6 and nylon 66 were $17.0 \times 10^{-12}$ and $19.0 \times 10^{-12}$ cm$^3$·cm/cm$^2$·sec·cm Hg, respectively.

EXAMPLES 2 THROUGH 4 AND COMPARATIVE EXAMPLES 3 AND 4

Bottles were prepared in the same manner as described in Example 1 except that nylon 6I copolymerized with adipic acid (nylon 6I/66) and nylon 6I copolymerized with ε-caprolactam (nylon 6I/6) were used instead of the nylon 6I used in Example 1, and the carbon dioxide gas permeation coefficient of each bottle was measured.

The obtained results are shown in Table 1.

TABLE 1

| | Copolymerization Composition (molar ratio) | $[\eta]$ | $P_{CO_2} \times 10^{-12}$ ($cm^3 \cdot cm/cm^2 \cdot sec \cdot cmHg$) |
| --- | --- | --- | --- |
| Example 2 | nylon 6I/66 (90/10) | 0.9 | 3.3 |
| Example 3 | nylon 6I/66 (70/30) | 0.9 | 5.1 |
| Comparative Example 3 | nylon 6I/66 (30/70) | 0.9 | 10.1 |
| Example 4 | nylon 6I/6 (70/30) | 1.0 | 5.0 |
| Comparative Example 4 | nylon 6I/6 (30/70) | 1.0 | 12.0 |

$P_{CO_2}$ was measured in contact with water.

Polyethylene terephthalate (hereinafter referred to as "PET") having an inherent viscosity of 0.74 was hot-air-dried at 160° C. for 5 hours, and a polyamide obtained by copoly-condensing a hexamethylene diamine/isophthalic acid salt and a hexamethylene diamine/adipic acid salt at a ratio shown in Table 2 was vacuum-dried at 100° C. for 10 hours. Both polymers were supplied to cylinders A and B, respectively, of a co-injection orientation blow-forming machine (Model ASB-50EX-T supplied by Nissei ASB Kikai). The set temperature of cylinder A was 260° to 280° C. and the set temperature of cylinder B (for formation of the intermediate layer) was 260° to 280° C. In a mold cooled by cooling water maintained at 15° C., PET was fed to the first stage from cylinder A, the polyamide was fed to the second stage from cylinder B, and PET was fed to the third stage from cylinder A, whereby co-injection molding was carried out and a three-layer preform in which the weight ratio of the intermediate layer was 20% by weight was formed.

In the obtained preform, the outer diameter of the cylindrical barrel was 25 to 26 mm, the thickness was 3.5 mm, the total length was 155 mm, and one end was closed as a bottom.

The preform was heated at 120° to 140° C., drawn in the axial direction in a bottle-shaped mold, and expanded in the lateral direction by compressed air, to form a bottle having an outer diameter of the barrel of 82 mm, a total height of 280 mm, a thickness of the barrel of 250 to 360 µm, and an inner capacity of 1040 to 1050 ml. The gas barrier property of the bottle was measured, and the obtained results are shown in Table 2.

For comparison, the gas barrier property of a bottle in which PET was also used for the intermediate layer was measured. The obtained results are shown in Table 2.

methylene diamine and isophthalic acid, and 40 parts of nylon 66 having an inherent viscosity $[\eta]$ of 1.21 at 260° to 280° C. by an extruder, was used instead of the polyamide used in Example 5.

The obtained bottle had a transparent appearance and the carbon dioxide gas barrier property (the amount of residual $CO_2$) was 3.67 under conditions of 15° C.×30% RH×120 days and 3.44 under conditions of 35° C.×80% RH×35 days.

EXAMPLE 8

A polyester bottle was molded in the same manner as described in Example 4 except that a polyamide mixture obtained by melt-kneading 70 parts of nylon 6I having an inherent viscosity $[\eta]$ of 1.0, which was formed from hexamethylene diamine and isophthalic acid, and 30 parts of nylon 6 having an inherent viscosity $[\eta]$ of 1.32 at 260° to 280° C. by an extruder, was used instead of the polyamide used in Example 4.

The obtained bottle had a transparent appearance, and the carbon dioxide gas barrier property (the amount of residual $CO_2$) was 3.67 under conditions of 15° C.×30% RH×120 days and 3.37 under conditions of 35° C.×80% RH×35 days.

EXAMPLES 9 THROUGH 13 AND COMPARATIVE EXAMPLES 7 AND 8

Polyethylene terephthalate ($[\eta]$=0.75, Tg=69° C.) was hot-air-dried at 160° C. for 5 hours and a copolyamide having an inherent viscosity $[\eta]$ of 1.15 and obtained by copolycondensing 80 parts of a hexamethylene diamine/isophthalic acid salt with 20 parts of a hexamethylene diamine/adipic acid salt, which was vacuum-dried at 100° C. for 8 hours, were melt-mixed at a ratio shown in Table 3, and the molten mixture was injection-molded at a molding temperature of 270° to 280° C. and a mold temperature of 10° C. to form a preform having one end closed as a bottom. The outer diameter of the resultant cylindrical barrel was 25 to 26 mm, the thickness was 3.5 mm, and the total length was 155 mm.

The preform was subjected to blow-forming at a preform-heating temperature of 110° to 140° C. by a biaxial draw-blow-forming machine (Model RHB-L supplied by Cincinnati Miraclon Co.) to obtain a bottle having an outer diameter of the barrel of 82 mm, a total height of 280 mm, a thickness of the barrel of 320 to 380 µm, and an inner capacity of 1040 to 1050 ml.

The falling impact strength and gas barrier property

TABLE 2

| | Material of Intermediate Layer hexamethylene-isophthalic acid salt/hexamethylene-adipic acid (molar ratio) | $[\eta]$ | Carbon Dioxide Gas Barrier Property [amount of residual $CO_2$ ($CO_2$ volume)] | | Appearance of Bottle |
| --- | --- | --- | --- | --- | --- |
| | | | 15° C. × 30% RH × 120 days | 35° C. × 80% RH × 35 days | |
| Example 5 | 80/20 | 1.15 | 3.68 | 3.43 | transparent |
| Example 6 | 50/50 | 1.09 | 3.61 | 3.36 | transparent |
| Comparative Example 5 | 20/80 | 1.24 | 3.51 | 3.17 | transparent |
| Comparative Example 6 | PET | 0.74 | 3.43 | 3.16 | transparent |

EXAMPLE 7

A polyester bottle was prepared in the same manner as described in Example 5 except that a polyamide mixture obtained by melt-kneading 60 parts of a polyamide (hereinafter referred to as "nylon 6I") having an inherent viscosity $[\eta]$ of 1.0, which was obtained from hexaof the obtained polyester bottle were evaluated, and the obtained results are shown in Table 3.

From the results shown in Table 3, it is seen that the bottles of Examples 9 through 13 according to the present invention have an excellent $CO_2$ barrier property and a satisfactory strength in practice.

TABLE 3

| | Composition (Parts by weight) | | Falling Impact Strength | Carbon Dioxide Gas Barrier Property [amount of residual $CO_2$ ($CO_2$ Volume)] | |
|---|---|---|---|---|---|
| | copolyamide | polyethylene terephthalate | (break ratio, %) | 15° C. × 30% RH × 120 days | 35° C. × 80% RH × 35 days |
| Example 9 | 5 | 100 | 0 | 3.52 | 3.31 |
| Example 10 | 10 | 100 | 0 | 3.58 | 3.38 |
| Example 11 | 30 | 100 | 0 | 3.72 | 3.52 |
| Example 12 | 50 | 100 | 0 | 3.78 | 3.56 |
| Example 13 | 100 | 100 | 10 | 3.81 | 3.59 |
| Comparative Example 7 | 0 | 100 | 0 | 3.43 | 3.16 |
| Comparative Example 8 | 200 | 100 | 80 | 3.84 | 3.62 |

EXAMPLE 14

A polyester bottle was prepared by mixing 100 parts of polyethylene terephthalate having an inherent viscosity [η] of 0.82 with 30 parts of a copolyamide having an inherent viscosity [η] of 1.15, which was formed by copolycondensing 60 parts of a hexamethylene diamine/isophthalic acid salt with 40 parts of a hexamethylene diamine/adipic acid salt, and moding the mixture in the same manner as described in Example 9. When the properties of the bottle were examined, it was found that the falling impact strength (break ratio) was 0% and the carbon dioxide gas barrier property (the amount of residual $CO_2$) was 3.57 under conditions of 15° C.×30% RH×120 days and 3.42 under conditions of 35° C.×80% RH×35 days.

EXAMPLE 15

A polyester bottle was prepared in the same manner as described in Example 9 except that a polyamide obtained by melt-kneading 70 parts of a polyamide having an inherent viscosity [η] of 1.0, which was obtained from hexamethylene diamine and isophthalic acid, and 30 parts of nylon 6 having an inherent viscosity [η] of 1.32 at 260° to 280° C. by an extruder, was used instead of the polyamide used in Example 9.

When the properties of the obtained bottle were examined, it was found that the falling impact strength (break ratio) was 0% and the carbon dioxide gas barrier property (the amount of residual $CO_2$) was 3.61 under conditions of 15° C.×30% RH×120 days and 3.45 under conditions of 35° C.×80% RH×35 days.

We claim:

1. A drawn hollow-molded body having improved gas barrier properties having a multi-layer structure comprising at least one layer composed of polyamide material including at least 50 mole % hexamethylene isophthalamide recurring units and at least one layer composed of polyethylene terephthalate wherein the polyamide layer comprises about 5 to 50% by weight of said hollow molded body.

2. A molded body as set forth in claim 1, wherein the content of the ethylene terephthalate units in the polyethylene terephthalate is at least 80 mole % based on the total recurring units.

3. A molded body as set forth in claim 1, wherein the inherent viscosity of the polyethylene terephthalate is at least 0.5.

4. A molded body as set forth in claim 1, which has a multi-layer structure including 2 to 5 layers, wherein the polyethylene terephthalate layer constitutes an inner layer and the polyamide layer constitutes an outer layer or an intermediate layer.

5. A molded body as set forth in claim 1 wherein the polyamide material is at least 80 mole % hexamethylene isophthalamide units.

6. A molded body as set forth in claim 1 wherein the intrinsic viscosity of the polyamide material is at least 0.5.

7. The multi-layer drawn hollow-molded body of claim 1 wherein the polyamide layer comprises 10 to 30% by weight of said hollow-molded body.

8. An oriented hollow-molded body having improved gas barrier properties composed of a resin composition comprising a polyamide material including at least 50 mole % hexamethylene isophthalamide recurring units and polyethylene terephthalate wherein the polyamide material is incorporated in an amount of about 1 to 100 parts by weight per hundred parts by weight of the polyethylene terephthalate.

9. A molded body as set forth in claim 8, wherein the content of ethylene terephthalate units in the polyethylene terephthalate is at least 80 mole % based on the total recurring units.

10. A molded body as set forth in claim 8, wherein the inherent viscosity of the polyethylene terephthalate is at least 0.5.

11. A molded body as set forth in claim 8 wherein the polyamide material is at least 80 mole % hexamethylene isophthalamide units.

12. A molded body as set forth in claim 8 wherein the intrinsic viscosity of the polyamide material is at least 0.5.

* * * * *

UNITED STATES PATENT AND TRADEMARK OFFICE
CERTIFICATE OF CORRECTION

PATENT NO. : 4,844,987
DATED : July 4, 1989
INVENTOR(S) : Masahiko Hirose, et al.

It is certified that error appears in the above-identified patent and that said Letters Patent is hereby corrected as shown below:

Column 3, line 40, change "in" to --is--;

Column 3, line 66, change "(4-8-" to --4-$\beta^2$--;

Column 4, line 13, change "66 nylon 6" to 66, nylon 6--;

Column 6, line 39, change "$10^{12}$" to --$10^{-12}$--;

Column 6, line 47, "$10^{12}$" to --$10^{-12}$--;

Column 7, line 12, insert over next paragraph and center --EXAMPLES 5 AND 6 AND COMPARATIVE EXAMPLES 5 and 6--;

Column 9, line 25, change "moding" to --molding--;

Column 10, line 9, change "3.52" to --3.53--;(table 3, last column).

Signed and Sealed this

Nineteenth Day of June, 1990

*Attest:*

HARRY F. MANBECK, JR.

*Attesting Officer*  *Commissioner of Patents and Trademarks*